G. W. GABLE.
NUT CRACKING MACHINE.
APPLICATION FILED MAR. 1, 1910.
1,069,542.
Patented Aug. 5, 1913.
5 SHEETS—SHEET 3.
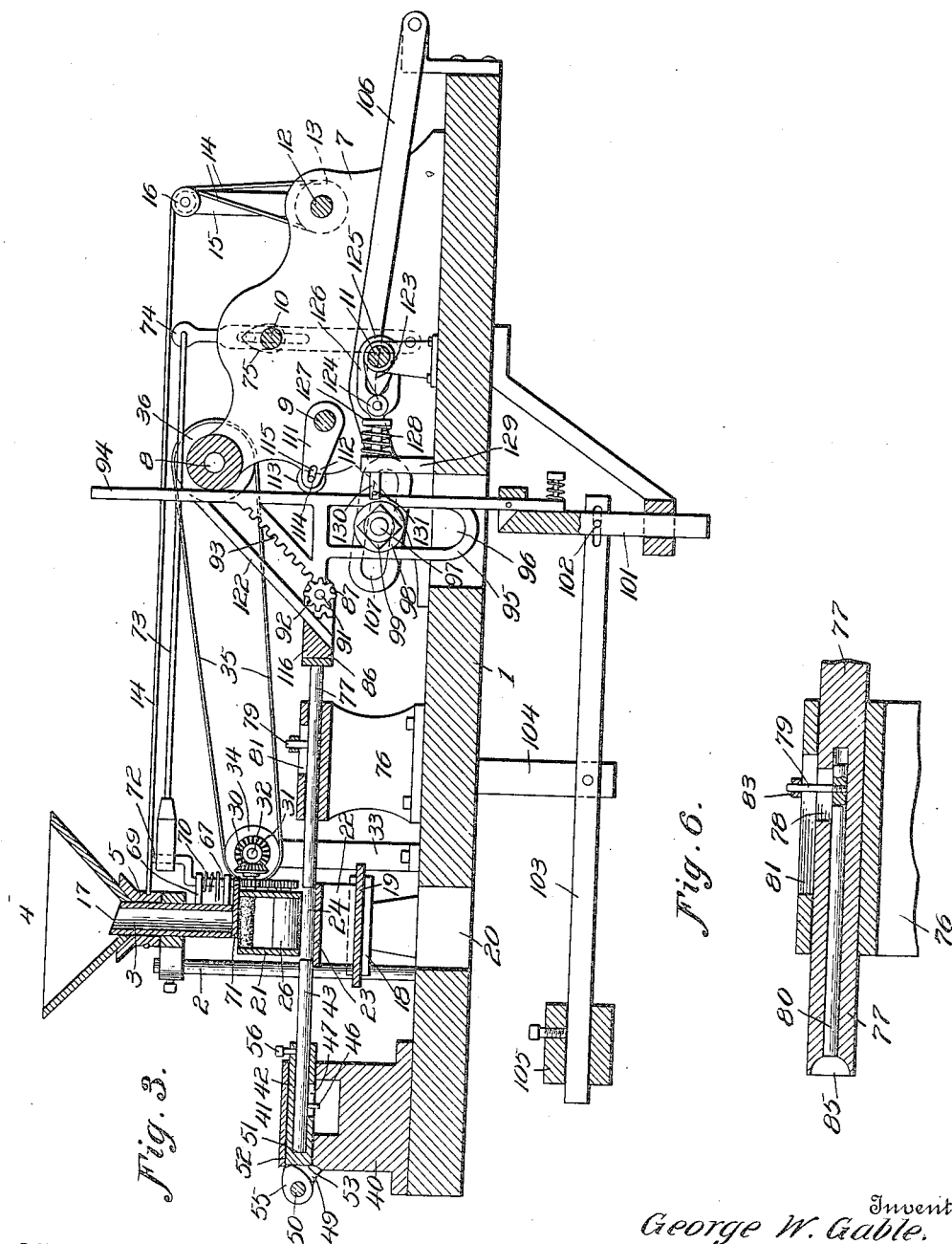
Witnesses
F. C. Gibson.
Inventor
George W. Gable.
By Victor J. Evans
Attorney

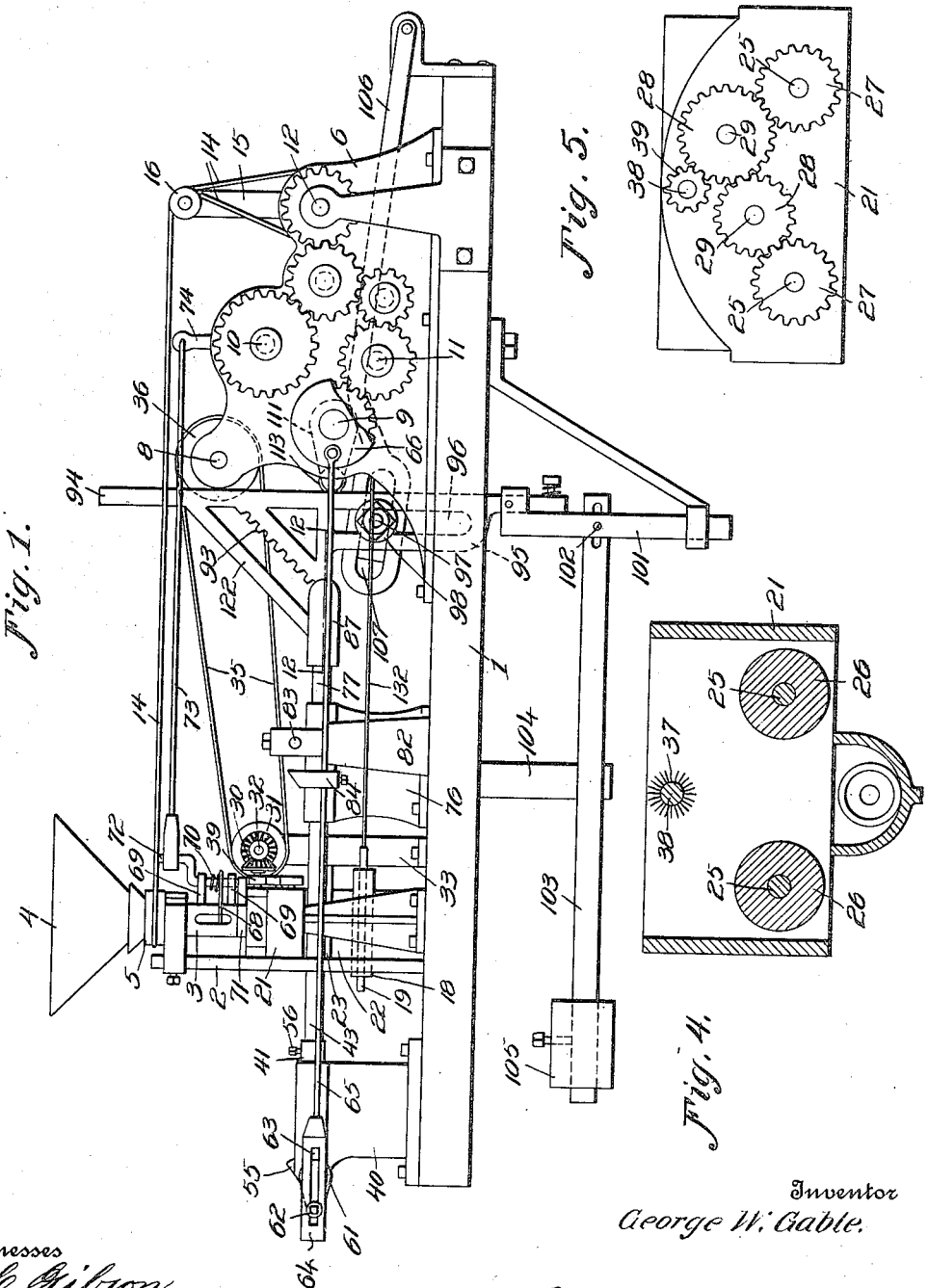

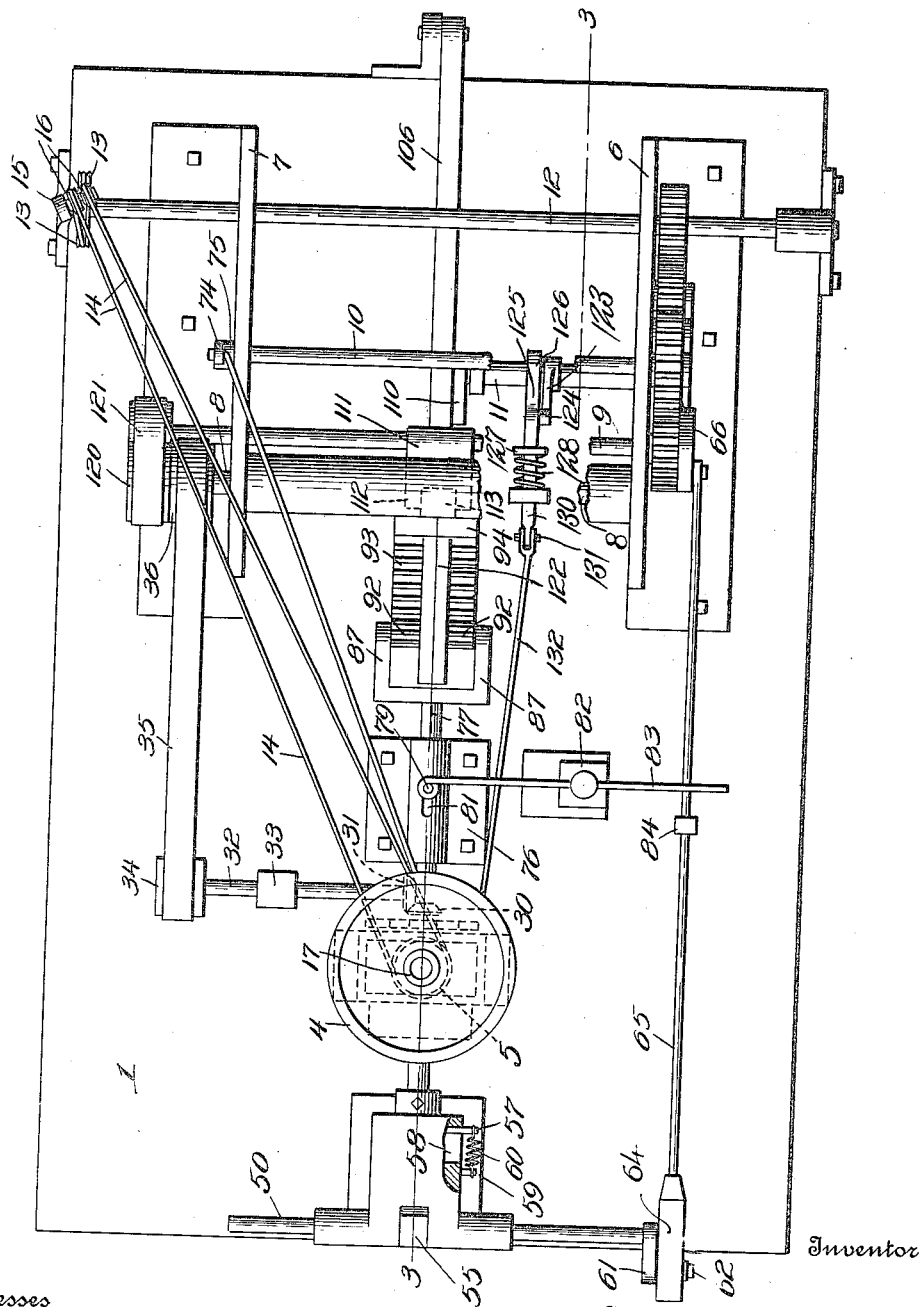

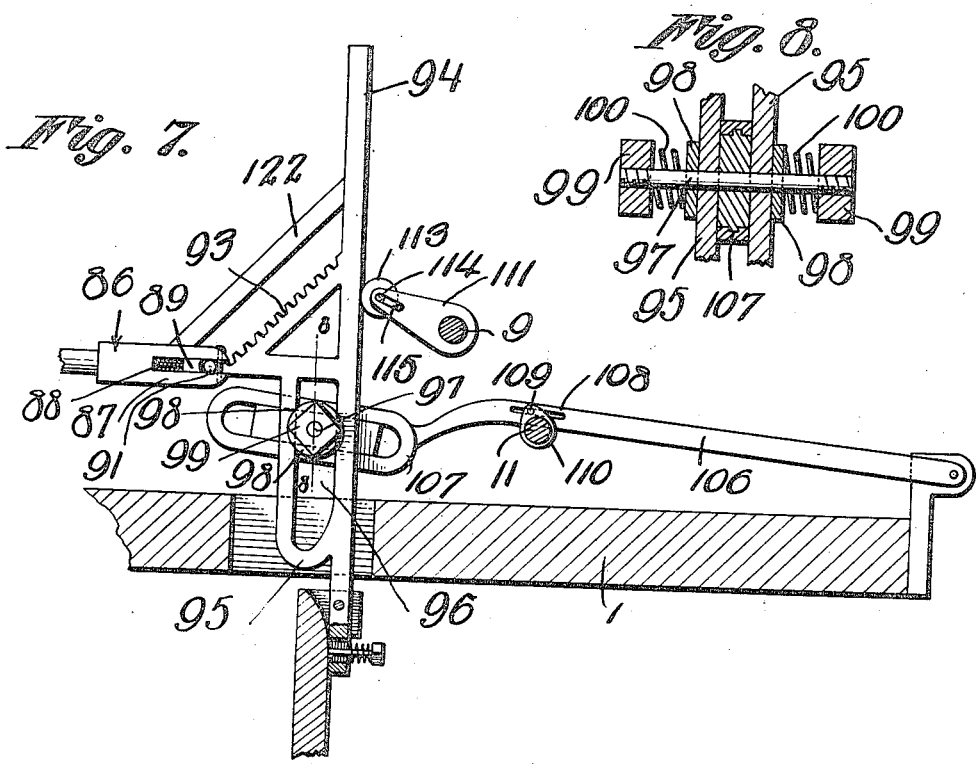

G. W. GABLE.
NUT CRACKING MACHINE.
APPLICATION FILED MAR. 1, 1910.

1,069,542.

Patented Aug. 5, 1913.
5 SHEETS—SHEET 5.

Witnesses
Chas. E. Richardson.
F. Delabar.

Inventor
George W. Gable,
By Victor J. Evans
Attorney

UNITED STATES PATENT OFFICE.

GEORGE W. GABLE, OF LOUISVILLE, KENTUCKY, ASSIGNOR OF ONE-HALF TO MARTIN GABLE, OF LOUISVILLE, KENTUCKY.

NUT-CRACKING MACHINE.

1,069,542.　　　　Specification of Letters Patent.　　Patented Aug. 5, 1913.

Application filed March 1, 1910. Serial No. 546,700.

*To all whom it may concern:*

Be it known that I, GEORGE W. GABLE, a citizen of the United States, residing at Louisville, in the county of Jefferson and State of Kentucky, have invented new and useful Improvements in Nut-Cracking Machines, of which the following is a specification.

This invention relates to nut cracking machines, and has for an object to provide a machine which will be so constructed as will permit a large or small amount of regular or irregularly formed nuts to be dumped into a hopper where they will be thoroughly gaged and finally delivered to straightening means so that each nut can be effectively operated upon by the cracking means.

A still further object is to provide a nut cracking machine in which nuts of various lengths may be gaged with accuracy and finally operated upon by the cracking means with the desired stroke of the coöperating elements forming the said cracking means without destroying or seriously mutilating the meat of the nuts.

Another object of my invention is to provide coöperating plungers beneath the feed hopper, the said plungers being operatively connected with novel and effective automatically operated shell ejecting means which is actuated upon the return movement of each plunger.

The above mentioned and other objects are attained by the construction, combinations and arrangements of parts, as disclosed on the drawings, set forth in this specification, and particularly pointed out in the appended claims.

Figure 10:
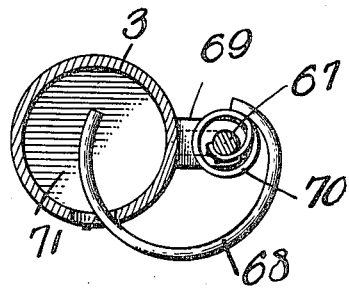
Figure 11:
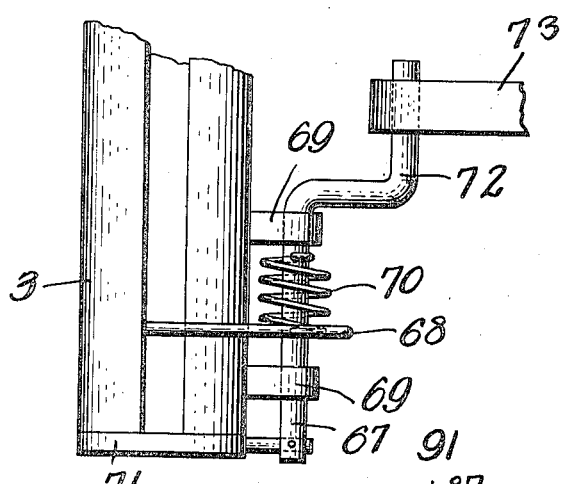
Figure 12:
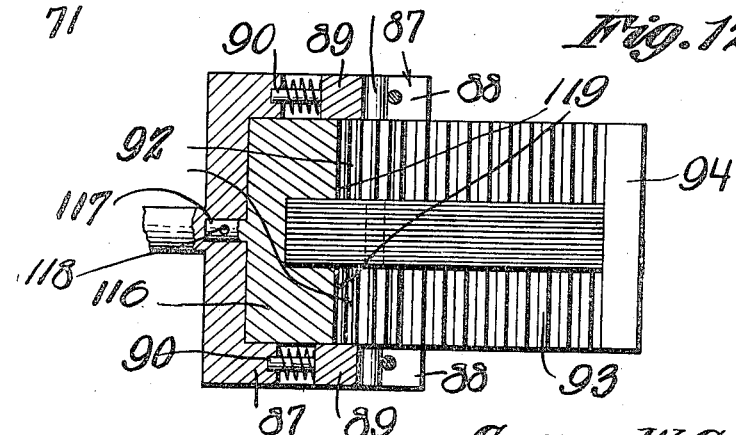

In the drawings, forming a portion of this specification and in which like numerals of reference indicate similar parts in the several views: Figure 1 is a side elevation of the nut cracking machine. Fig. 2 is a top plan view of the machine. Fig. 3 is a detail longitudinal section taken on the line 3—3 of Fig. 2. Fig. 4 is a detail section through the lower portion of the feed hopper showing the nut straightening means. Fig. 5 is a detail end view of the lower portion of the feed hopper showing the driving means for the straightening means. Fig. 6 is a detail longitudinal section through one of the nut cracking plungers. Fig. 7 is a detail side elevation with parts in section of the nut cracking plunger actuating means. Fig. 8 is a detail section taken on the line 8—8 of Fig. 7. Fig. 9 is a detail longitudinal section through the coöperating nut cracking plunger. Fig. 10 is a detail top plan view of the discharge gate. Fig. 11 is a side view of a portion of the nut chute. Fig. 12 is a section on line 12—12 of Fig. 1.

My improved nut cracking machine consists of a table or base member 1 which may be of any well known form that may be found most desirable for this particular occasion. The table or base member is provided with a vertically extending bracket or support 2 to which is secured a vertically extending tube 3 which forms a runway for the nuts which are adapted to be discharged from the hopper 4 into the said runway. The hopper is revolubly mounted upon the tube 3 and is provided with a horizontally grooved pulley 5. The said base member or table is provided with a pair of spaced brackets 6 and 7 in which shafts 8, 9, 10, 11 and 12 are journaled. The shaft 12 is preferably a driven shaft which is adapted to be operated by a motor of any well known and desired form. This shaft is provided with a pulley 13 which is geared with the pulley 5 by means of a belt or equivalent driving connection 14. In order that the belt can be accurately guided, I preferably provide the base member with an upwardly extending arm or standard 15 which carries guide rollers or pulleys 16 which are located at a point immediately above the pulley 13 upon the shaft 12. This construction is such that when power is applied to the shaft 12, the said power will be transmitted to the hopper so as to effectively revolve the same in order that the nuts may be independently and accurately positioned in the runway formed in the tube 3. In order that the nuts may be assured or still further provided with means permitting them to be accurately operated upon, I preferably form the upper end of the tube 3 with an inclined portion 17 which in practice forms what may be termed a cam face which coöperates with the nuts upon revoluble movement of the hopper so as to effect the hereinbefore described independent discharge.

The base member or table is provided with a pair of spaced guideways 18 which are properly spaced or positioned from each other to receive the side edge portions of a sliding gate 19. This gate operates at a point immediately above the exit passage 20 formed in the base member or table, and as shown, the said gate is disposed in line with the member or casing 21 which broadly forms a portion of the hopper. The said gate carries an upwardly extending web 22 which is provided at its upper end with a longitudinally extending head 23 in which is formed a nut receiving concavity 24. The casing or member 21 is provided with a pair of horizontally disposed shafts 25 upon which are secured in any well known manner straightening rollers 26 which are adapted to operate upon the nuts so that they can be effectively and accurately lodged in the concavity 24 formed in the head 23. The rollers 26 are disposed in spaced relation to each other and as shown the shafts of the said rollers are provided with pinions or gears 27 which mesh with a train of idler gears 28 which are mounted upon shafts 29 which extend from the casing or member 21. One of the said shafts 29 carries a bevel gear 30 which meshes with a similar gear 31 upon a shaft 32 which extends from a bracket 33 upon the base member or table. The shaft 32 carries a pulley 34 which is connected preferably by a belt 35 with a driving pulley 36 upon the shaft 8. A brush 37 is carried by a shaft 38 which has its end journaled in the walls of the casing 21, and as illustrated the said shaft carries a gear 39 which is driven by the hereinbefore mentioned train of gears 28. The brush is preferably located at a point immediately beneath the runway formed by the discharge tube 3 and acts when in operation in conjunction with the straightening rollers.

A member or bracket 40 is supported upon the base member or table 1 and has slidably mounted therein a plunger 41 which comprises telescopic sections 42 and 43, respectively. The section 43 has formed therein a longitudinally extending bore 44 in which is disposed an ejecting member which preferably embodies a rod 45 which carries a depending finger or pin 46 adapted to slide in a slot 47 in the member or bracket 40. The extreme outer extremity of the section 43 is formed with a dished portion or cup shaped concavity 48. The member or bracket 40 is provided with bearings 49 in which a shaft 50 is revolubly mounted. The bearings are disposed in spaced relation to each other centrally of the bracket or member 40 so as to form a slot 51 which opens directly into the passage 52 formed in the member or bracket 40. The outer end of the section 42 of the plunger is provided with a head 53 which is formed with a surface 54 adapted for coöperation with the cam 55 upon the shaft 50. The section 43 of the plunger is adjustably connected with the section 42 and is adapted to be held in its adjusted position by means of a clamping screw 56 or similar equivalent retaining device which may be carried by the section 42. A pin 57 extends from the section 42 of the plunger and operates in a slot 58 formed in the member or bracket 40. A pin 59 extends from the bracket or member 40 and has engaged therewith one end of a retractile spring 60, the other end of said spring being engaged with the pin 57.

The shaft 50 carries an eccentric 61 from which extends a pin 62 which is operatively positioned in a longitudinally extending slot 63 formed in the head 64 of a rod 65. The opposite end of the said rod is operatively connected with a crank wheel 66 upon the shaft 9. Incident to the slotted construction of the head 64, and the connection of the said head with the eccentric 61 it will be appreciated that revoluble motion of the crank wheel will reciprocate the rod 65 so as to impart to the shaft 50 an oscillatory movement. The tube 3 which depends from the hopper is provided with a revoluble shaft 67 upon which is loosely mounted an arcuate gage member 68. One of the bearing members 69 of the shaft 67 has secured thereto one end of a coil spring 70, the other end of the said spring being secured to the arcuate gage member 68. The lower extremity of the shaft 67 is provided with a door or closure 71 which works across the lower open end of the tube 3. The construction of the shaft 67 is such that when the same is operated the nuts within the tube will be effectively operated upon so as to permit them to drop singly into the straightening means. The gage member 68 operates within the tube so as to prevent the nut from forming an obstruction within the tube as will be readily understood. The upper end of the shaft 67 carries a crank arm 72 which is operatively connected with one end of a rock arm 73. The other end of the rock arm carries a slotted link 74 which is operatively connected with an eccentric 75 upon the shaft 10. The lower end of the link 74 is pivoted to the bracket 7 so that it can freely rock thereon.

A bracket 76 is mounted upon the base or table 1, and as shown, this bracket is apertured longitudinally so as to slidably receive therein the plunger 77 which is disposed immediately in line with the plunger 41. The plunger 77 is provided with a longitudinally extending slot 78 in which is slidably mounted a pin or finger 79 which is carried by an ejector 80 which is identical in construction with the ejector 45 hereinbefore described. The pin or finger 79 besides working in the slot 78 is movable longitudinally in a slot 81 which is formed in the bracket 76. A post 82 is mounted on the base 1 adjacent to the bracket 76, and as shown this post has mounted thereon for horizontal pivotal movement a member 83. This member is connected at one end with the pin or finger 79 and at the other end the member extends directly in the path of movement of an actuating element or dog 84 upon the rod 65. It will be seen that when the rod 65 is actuated through the eccentric 61, the plunger 77 starts to move away from its coöperating plunger, the element or dog 84 will engage and rock the member 83, and during such operation will cause the outer extremity of the ejector 80 to be projected into the nut receiving concavity which is formed in the plunger 77. The ejector 80 is returned to inactive position upon the reverse movement of the plunger 77. This movement of the ejector will effectively discharge any waste particles of shells as will be understood. The rear extremity of the plunger 77 is provided with a head 86 which is provided with a pair of spaced arms 87. These arms are provided with longitudinally extending slots 88 in which are slidably mounted boxes 89. The boxes 89 are provided with stems 90 around which are coiled springs or similar elastic means which are adapted for operation to normally force the boxes 89 to the outward limit of their movement. The boxes 89 receive the ends of a shaft 91 upon which a pair of pinions 92 are secured. The said pinions are normally engaged with the teeth of a rack bar 93 which is formed upon the member 94 of a plunger return and actuating mechanism. The said plunger return and actuating mechanism is provided with a depending member 95 in which is formed a vertical slot 96 for the reception of a pin 97. This pin is provided with a pair of spaced washers 98 which are yieldingly engaged against the outer faces of the depending member 95. The extremities of the pin 97 are threaded for the reception of adjusting nuts 99 between which and the washers are confined helical expansion springs 100. The lower extremity of the member 95 is pivoted to a vertically movable member 101 which is supported by a bracket upon the frame or base 1. The member 101 is provided with a horizontally disposed pin 102 which is mounted in a longitudinally extending slot at one end of a bar 103 which is fulcrumed upon a bracket 104 upon the base or table 1. The bar 103 carries a counterbalancing weight 105.

A member 106 is pivoted at one of its ends to a bracket which arises from the base or table 1, and at the other end this member is provided with a slotted head 107 which is operatively connected with the pin 97 and the depending member 95. The member 106 has formed therein a longitudinally extending slot 108 in which operates a pin 109 of an eccentric 110 upon the shaft 11. It will be seen that when power is applied to the shaft 11 the eccentric 110 will be actuated sufficiently to impart to the member 106 a rocking movement. The shaft 9 has mounted thereon a bracket 111 which carries a pair of spaced arms 112 which receive therebetween a roller 113 which has its ends provided with pintles 114 which are adjustably mounted in slots 115 formed in the arms 112. When power is applied to the shaft 9 the bracket 111 will be revolved with the shaft and the roller 113 will be operatively brought into engagement with the member 94 of the return mechanism so as to force the said member in a direction toward the plunger 77. In this movement of the member the teeth of the rack bar will engage the teeth of the gear wheels 92 so as to impart to the plunger 77 the desired movement. In other words the movement of the member 106 is sufficient to restore the member 94 to its vertical position.

A dog 116 is mounted between the arms 87 and is provided with a stem 117 which is disposed in a correspondingly formed recess in the head 86. A retaining pin 118 is passed through the stem 117 and through the wall of the recess formed in the head so as to hold the dog stationary. The dog is provided with spaced jaws 119 which are toothed at their outer ends, the said toothed ends being normally disposed in spaced relation to the gears 92 but are adapted for coöperation therewith for a purpose to be hereinafter described. The shaft 8 is provided with a driving pulley 120 which is operatively connected by means of a driving belt 121 with a pulley upon one end of the shaft 9. A guide bar 122 is mounted upon the member 94 and is disposed in spaced relation to the rack bar upon the said member, and as shown, the said guide bar is slidably mounted between the jaws of the dog 116.

In operation of the herein described nut cracking machine, a quantity of nuts are placed in the hopper 4 where they may be accurately fed to the straightening rollers independently and finally deposited upon the head 23 and placed at a point in line with the plungers 77 and 43 respectively. After this operation the shaft 50 will be actuated so that the cam or eccentric 55 will be operatively forced into engagement with the plunger 43 so as to move the same toward the plunger 77. When the squared face of the cam or eccentric 55 abuts against the squared face 54 of the plunger head 53 the plunger 43 will be held against the tension of the spring 60. The plunger 77 will be moved toward the plunger 43 incident to the fact that the teeth of the rack bar upon the member 94 will engage the pinions or gears 92, it being understood that in this operation the member 94 will be moved directly downwardly in a vertical plane.

After the plunger 77 abuts against or is engaged with the nut to be operated upon, the resistance offered the said plunger will be sufficient to cause the pinions or gears 92 in further downward movement of the member 94 to engage the toothed jaws of the dog 116. This construction is such that the movement of the plunger 77 will be effectively gaged and its movement will approximately cease after it has engaged the nut as just mentioned. After the member 94 has been thus actuated to impart the described movement to the plunger 77, the roller 113 will engage the member 94 and move the same angularly so that the plunger 77 can be forced with the desired pressure against the shell of the nut so as to effectively break the same. After the nut has been broken it is obvious that the sliding gate 19 will be moved in a position to uncover the exit passage 20 so as to permit the escape of the cracked nut therethrough.

The shaft 11 has mounted thereupon an eccentric 123 which is adapted to engage a roller 124 upon a sliding member 125 which is mounted upon the base or table 1. The member 125 is provided with a slotted head 126 at one end of which is operatively connected the shaft 11. The member 125 has mounted thereupon a collar 127 against which one end of a spring 128 is engaged, the other end of said spring being confined against a portion of a bracket 129 upon the base or table 1. The member 125 is provided with an arm 130, said arm carrying a pin 131, the latter being operatively connected with an actuating rod or connection 132. Said connection 132 is connected at its opposite end with the gate 19.

I claim:—

1. A nut cracking machine comprising a sliding plunger, a second sliding plunger adapted for coöperation with the first named plunger, a vertically and angularly movable member, a rack bar carried by said member, a horizontally movable gear carried by the second named plunger, means for normally holding the gear engaged with said rack bar, a dog carried by the second named plunger adapted for locking engagement with the gear so as to hold the same against rotation and prevent downward movement of the said member, and means for coöperating with the said member when its rack bar is locked to the said gear by said dog so as to force the second named plunger toward the first named plunger.

2. A nut cracking machine comprising a hopper, a discharge tube connected with the hopper, means for rotating the hopper upon the discharge tube, rotatably mounted nut straightening means beneath the discharge tube, and coöperating nut cracking plungers beneath the straightening means.

3. A nut cracking machine consisting of a table having an exit passage, a hopper supported upon the table, nut straightening means beneath the said hopper, means beneath said nut straightening means, for cracking said nuts, means for operating said latter mentioned means, guide ways, a gate slidably mounted in said guide-ways at a point above said exit passage, and means connected with the gate for operating the same.

4. A nut cracking machine consisting of a table having an exit passage, a hopper supported upon the table, nut straightening means beneath the said hopper, means beneath said nut straightening means for cracking said nuts, means for operating said latter mentioned means, guide-ways, a gate slidably mounted in said guide-ways at a point above said exit passage and means connected with the gate for automatically operating the same.

5. A nut cracking machine consisting of a table having an exit passage, a hopper supported upon the table, nut straightening means beneath said hopper, nut cracking means mounted on said table, guide-ways, a gate slidably mounted in said guide-ways, brackets on said table, a plurality of driven shafts journaled in said brackets, means operatively connected with one of said shafts for revolving said hopper, means operatively connected with another of said shafts for operating said nut straightening means, means operatively connected up with another of said shafts for automatically operating the said gate and means operatively connected with another of said shafts for operating the said nut cracking means.

6. A nut cracking machine comprising a hopper, a discharge tube connected with the hopper having means for effecting discharge of the nuts singly from the hopper, means for rotating the hopper upon the discharge tube, a casing disposed beneath said hopper, shafts mounted in the said casing and nut straightening means mounted on the said shafts, means for revolving said shafts and coöperating nut cracking plungers beneath the straightening means.

In testimony whereof I affix my signature in presence of two witnesses.

GEORGE W. GABLE.

Witnesses:
JOHN L. FLETCHER,
JAMES A. KOEHL.